(12) United States Patent
Nobuhara et al.

(10) Patent No.: US 9,779,573 B2
(45) Date of Patent: Oct. 3, 2017

(54) COIN PROCESSING DEVICE

(71) Applicant: NIPPON CONLUX CO., LTD., Sakado-shi (JP)

(72) Inventors: Akihiro Nobuhara, Sakado (JP); Kunio Iwakawa, Sakado (JP)

(73) Assignee: NIPPON CONLUX CO., LTD., Sakado-shi (JP)

( * ) Notice: Subject to any disclaimer, the term of this patent is extended or adjusted under 35 U.S.C. 154(b) by 0 days.

(21) Appl. No.: 15/101,799

(22) PCT Filed: Jun. 10, 2014

(86) PCT No.: PCT/JP2014/065342
§ 371 (c)(1),
(2) Date: Jun. 3, 2016

(87) PCT Pub. No.: WO2015/083388
PCT Pub. Date: Jun. 11, 2015

(65) Prior Publication Data
US 2017/0169645 A1    Jun. 15, 2017

(30) Foreign Application Priority Data
Dec. 3, 2013   (JP) .................................. 2013-249992

(51) Int. Cl.
*G06M 1/00*   (2006.01)
*G06M 3/00*   (2006.01)
(Continued)

(52) U.S. Cl.
CPC ................. *G07D 3/00* (2013.01); *G07F 9/00* (2013.01); *H02H 3/207* (2013.01); *H02H 9/02* (2013.01);
(Continued)

(58) Field of Classification Search
CPC .. G07D 1/00; G07D 1/02; G07D 1/04; G07D 1/06; G07D 3/00; G07D 3/14; G07D 3/16;
(Continued)

(56) References Cited

U.S. PATENT DOCUMENTS 5,442,568 A * 8/1995 Ostendorf ................. G07F 5/18
221/129
5,924,081 A * 7/1999 Ostendorf .............. G06Q 40/12
700/231
(Continued)

FOREIGN PATENT DOCUMENTS

| JP | 3-218227 A | 9/1991 |
|----|------------|--------|
| JP | 5-146057 A | 6/1993 |

(Continued)

OTHER PUBLICATIONS

English translation of the International Preliminary Report on Patentability and Written Opinion issued Jun. 16, 2016 in PCT/JP2014/065342.
(Continued)

*Primary Examiner* — Jeffrey Shapiro
(74) *Attorney, Agent, or Firm* — Oblon, McClelland, Maier & Neustadt, L.L.P.

(57) ABSTRACT

Breakage of electrical components inside is prevented when live wire insertion-and-removal is performed after inhibition of an increase in costs.
A coin processing device 1 includes a coin sorting unit 3, a coin housing unit 2, and a harness 4. The coin housing unit has a first connector 21 including a first terminal TH2, a second terminal TL1, and a first ground terminal TG1. The coin sorting unit includes: a second connector 31 coupled to the first connector through the harness, the second connector 31 including the third terminal TH4 to which a high voltage is supplied through the first terminal, a fourth terminal TL2
(Continued)

configured to supply a low voltage to the second terminal, and a second ground terminal TG2 grounded through the first ground terminal; a low-voltage power source circuit 32 configured to generate the low voltage from the high voltage supplied to the third terminal, and configured to output the low voltage from a low-voltage output terminal 32t; and a switch circuit 34. The switch circuit disconnects electrical connection between the low-voltage output terminal and the fourth terminal in a case where a difference between a voltage at the second ground terminal and a voltage at the low-voltage output terminal has been less than a threshold value.

5 Claims, 5 Drawing Sheets

(51) Int. Cl.

| | |
|---|---|
| *G07F 9/08* | (2006.01) |
| *G07D 3/00* | (2006.01) |
| *G07F 9/00* | (2006.01) |
| *H02H 3/20* | (2006.01) |
| *H02H 9/02* | (2006.01) |
| G07D 1/00 | (2006.01) |
| G07D 9/00 | (2006.01) |
| G07D 11/00 | (2006.01) |
| G07D 13/00 | (2006.01) |
| G07D 5/00 | (2006.01) |
| G07F 5/00 | (2006.01) |
| G07F 11/00 | (2006.01) |

(52) U.S. Cl.
CPC ............... *G07D 1/00* (2013.01); *G07D 9/00* (2013.01); *G07D 11/0081* (2013.01); *G07D 13/00* (2013.01); *G07D 2201/00* (2013.01); *G07F 3/00* (2013.01); *G07F 3/04* (2013.01); *G07F 5/00* (2013.01); *G07F 11/00* (2013.01)

(58) Field of Classification Search
CPC ............ G07D 5/00; G07D 9/00; G07D 9/004; G07D 9/008; G07D 9/04; G07D 11/0051; G07D 11/0081; G07D 11/0084; G07D 11/0087; G07D 11/009; G07D 13/00; G07D 2201/00; G07D 2205/00; G07F 1/06; G07F 3/00; G07F 3/02; G07F 5/00; G07F 11/00; G07F 13/00; G07F 15/00; G07F 17/00; G07F 17/3244; G07F 19/00
USPC ......... 194/350, 353, 344, 215–218; 453/1–3, 453/16–18, 58, 61, 63; 235/379; 209/534; 382/135, 136; 902/8, 10, 12, 902/30, 32, 41; 200/DIG. 3; 178/2 R, 178/2 F; 222/2; 340/5.86; 377/7, 8; 434/110; 705/42–44; 700/236, 231, 241, 700/244
See application file for complete search history.

(56) References Cited

U.S. PATENT DOCUMENTS

| | | | |
|---|---|---|---|
| 6,390,269 B1 * | 5/2002 | Billington | G07F 9/006 194/217 |
| 6,640,156 B1 * | 10/2003 | Brooks | G07D 11/0081 209/534 |
| 6,839,610 B2 * | 1/2005 | Carstens | G07F 9/026 700/236 |
| 7,690,495 B1 * | 4/2010 | Kolls | G07F 9/026 194/350 |
| 8,251,360 B2 * | 8/2012 | Mori | G07D 11/0081 194/205 |
| 2004/0069590 A1 * | 4/2004 | Corrick | G07D 7/00 194/206 |
| 2004/0249501 A1 * | 12/2004 | Hand | G07D 7/00 700/231 |
| 2006/0219515 A1 * | 10/2006 | Soussa | G07F 7/04 194/206 |
| 2007/0119680 A1 * | 5/2007 | Saltsov | G07D 11/0078 194/206 |

FOREIGN PATENT DOCUMENTS

| | | |
|---|---|---|
| JP | 7-114668 A | 5/1995 |
| JP | 2003-131768 A | 5/2003 |
| JP | 2009-171731 A | 7/2009 |
| JP | 2013-25696 A | 2/2013 |

OTHER PUBLICATIONS

International Search Report Issued Jul. 29, 2014 in PCT/JP14/065342 Filed Jun. 10, 2014.

\* cited by examiner

[Fig.1]
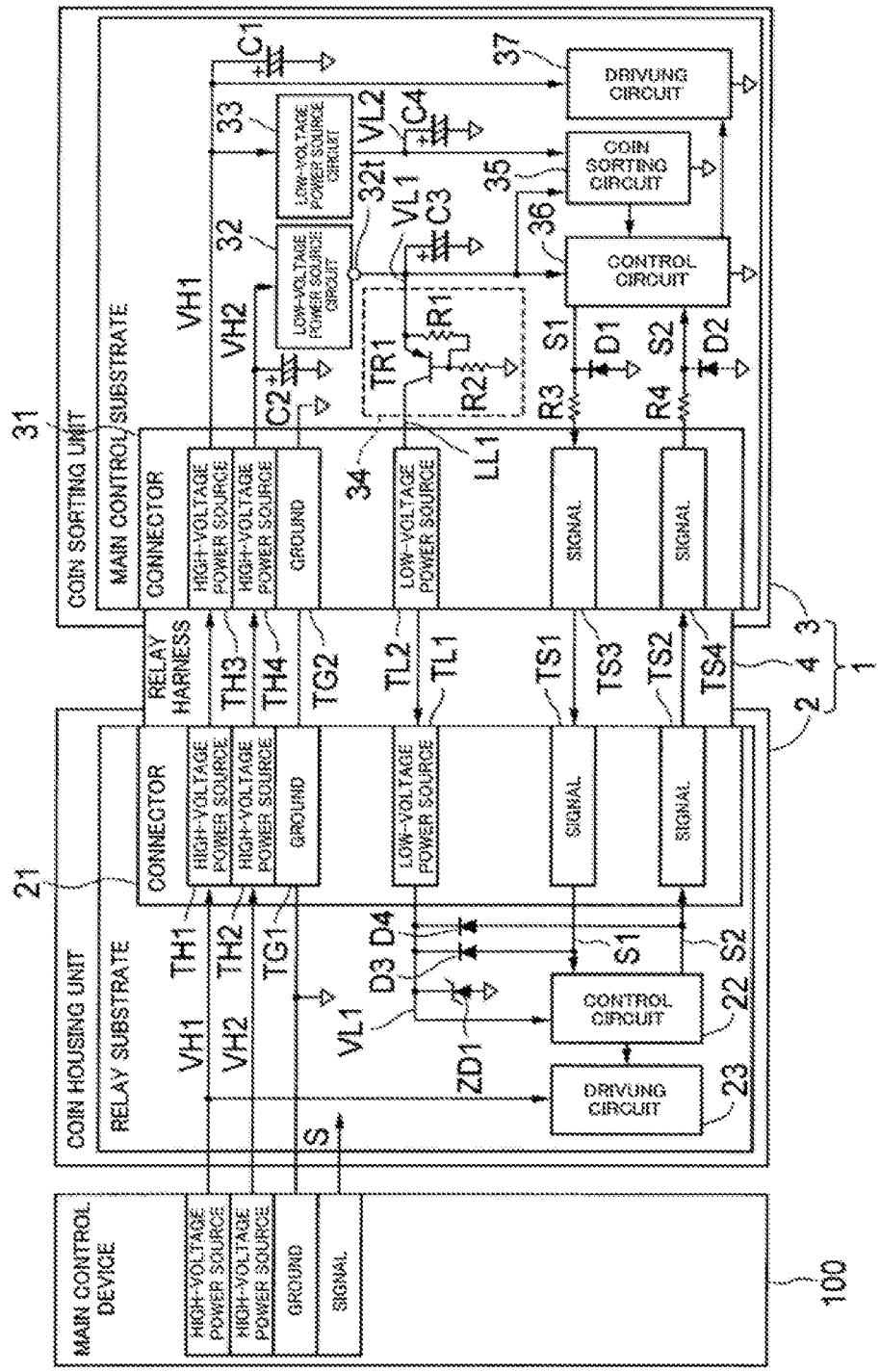

[Fig.2]
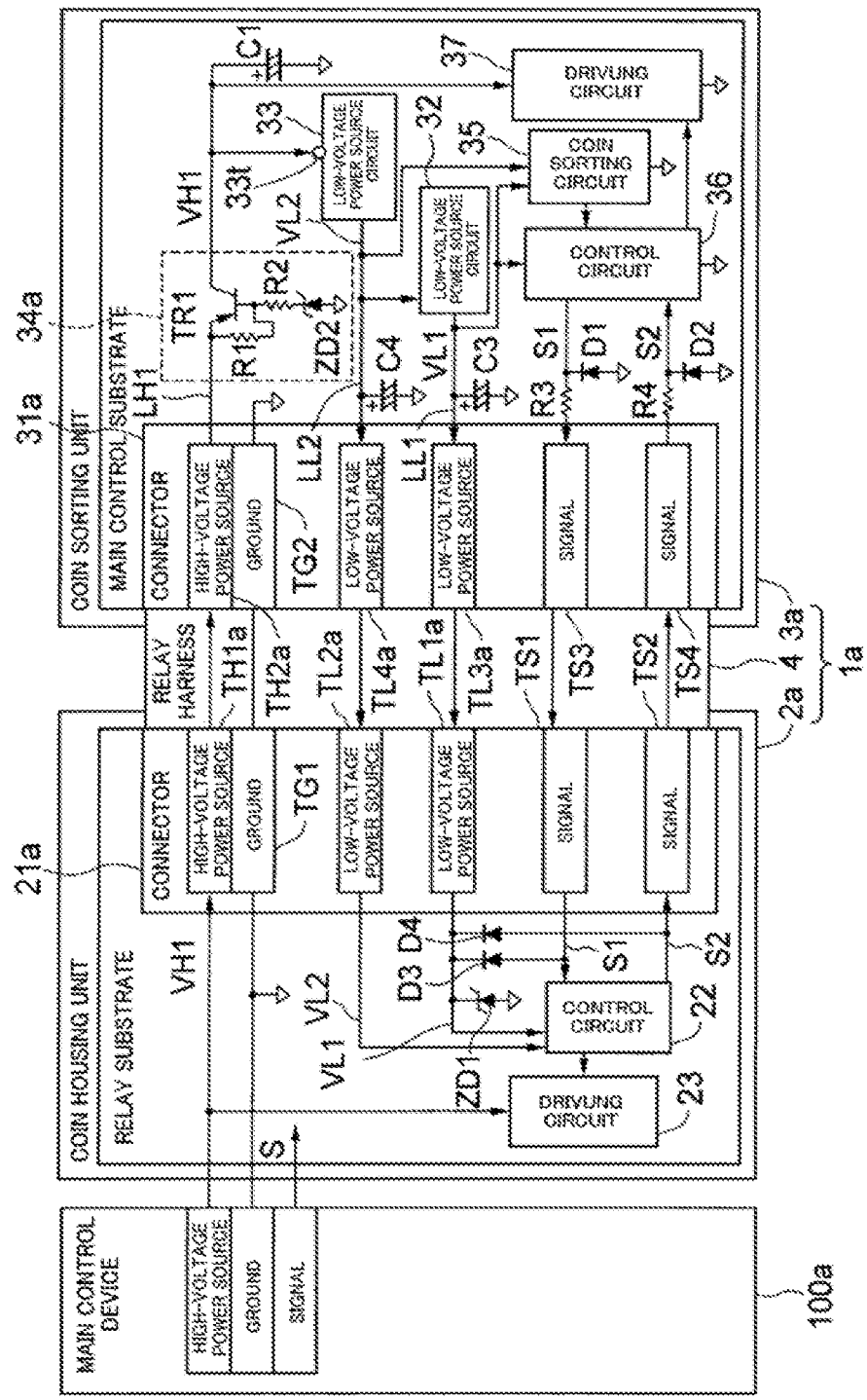

[Fig.3]
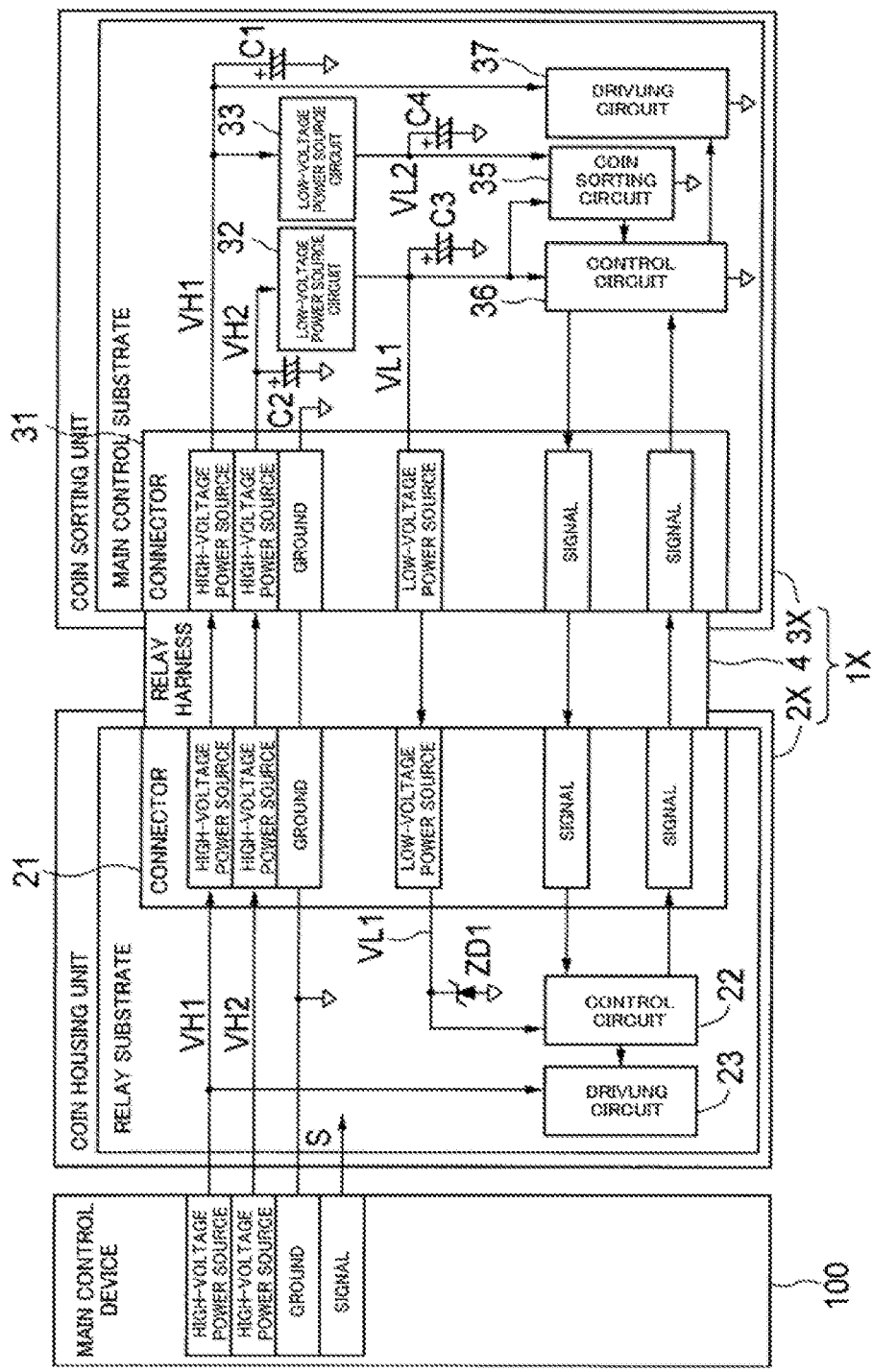

[Fig.4]
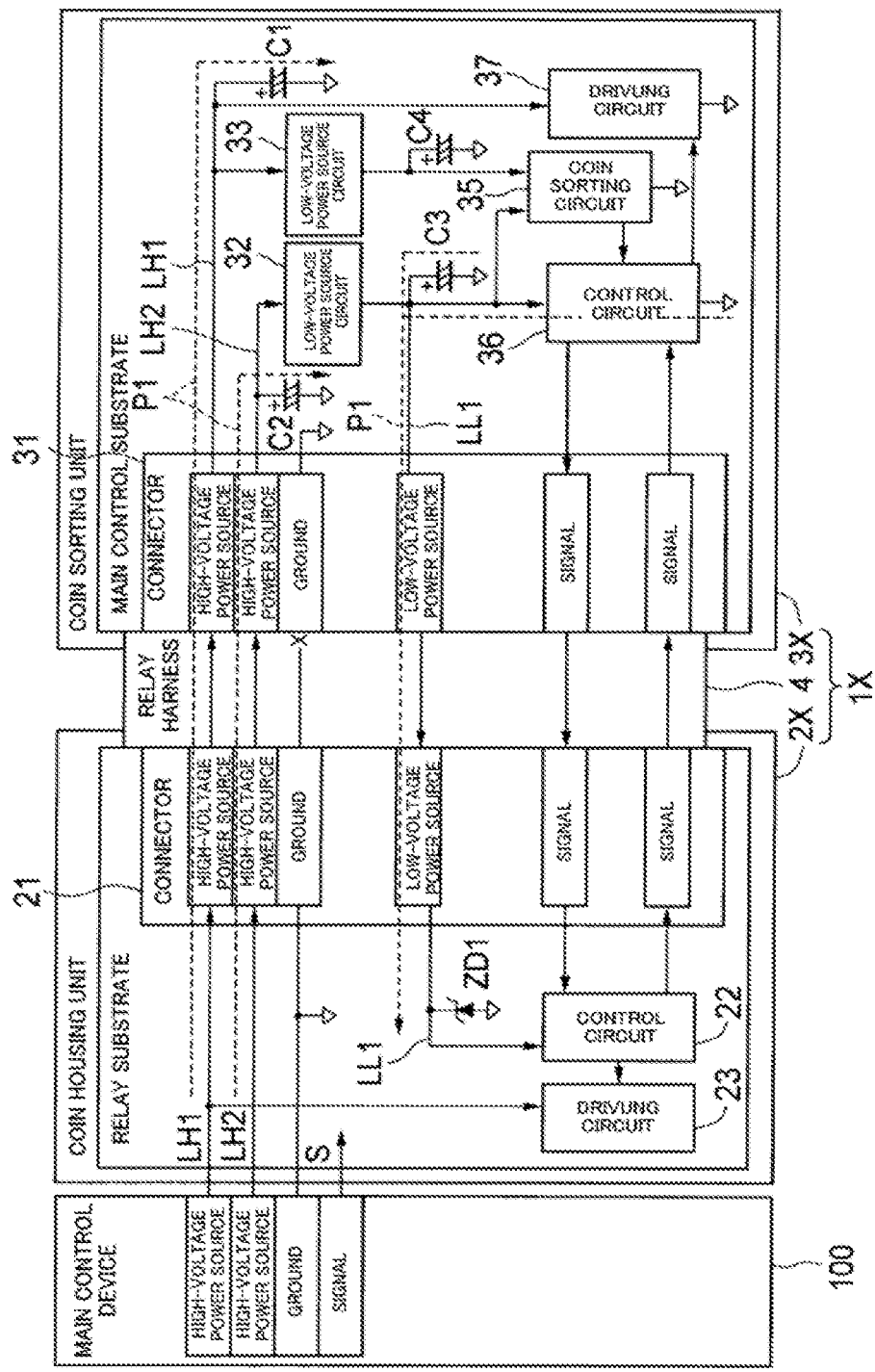

[Fig.5]
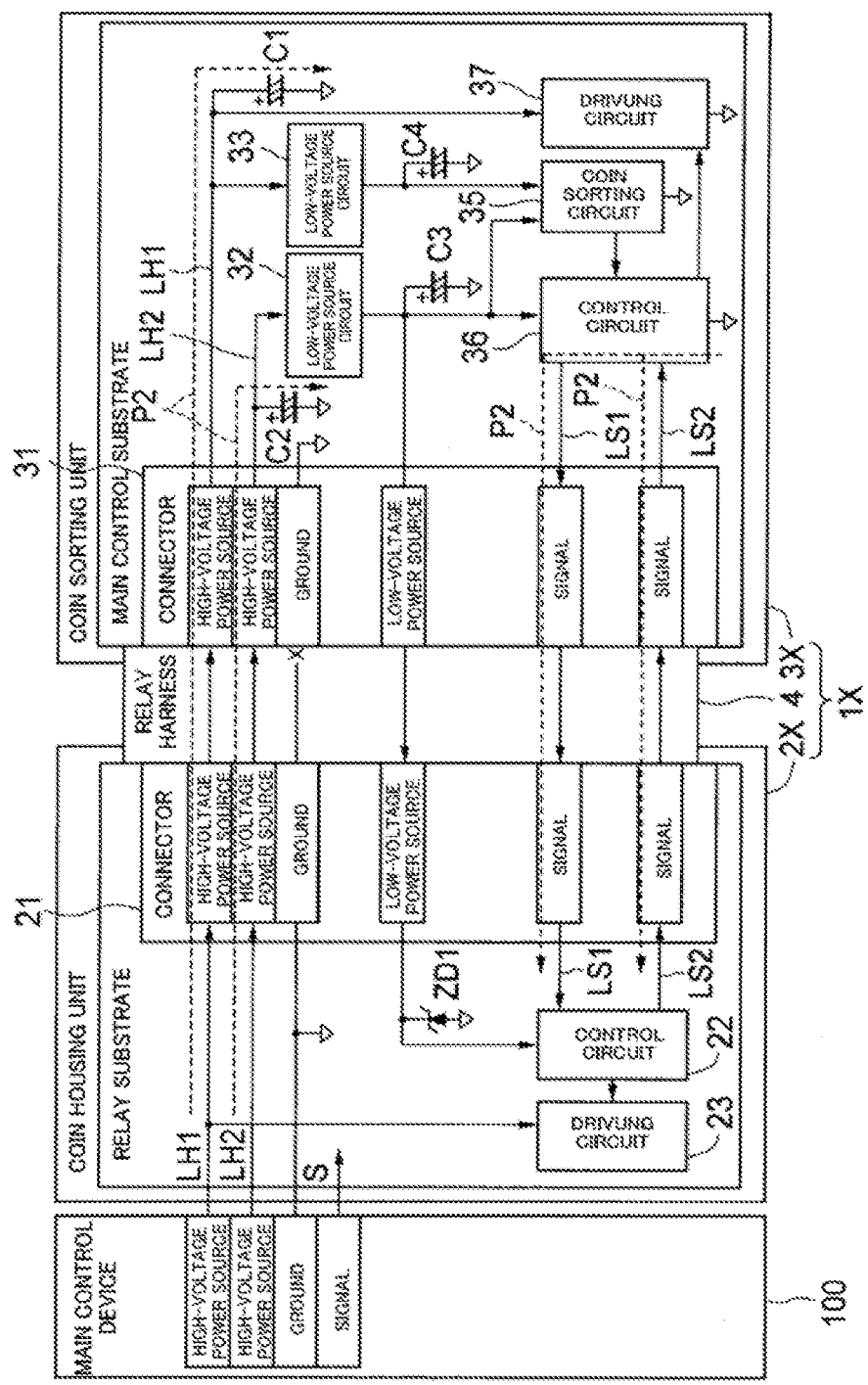

COIN PROCESSING DEVICE

TECHNICAL FIELD

The present invention relates to a coin processing device to be installed in a vending machine, a money changer, a fare adjustment machine, a ticket-vending machine, a servicing apparatus, or the like (hereinafter, referred to as a "vending machine or the like"). In particular, the present invention relates to a coin processing device including a coin sorting unit and a coin housing unit that are electrically coupled to each other through a harness insertable and removable.

BACKGROUND ART

A coin processing device 1X that distinguishes whether coins that have been inserted are genuine and also sorts and houses, each denomination, coins that have been distinguished as genuine coins, is installed inside a vending machine or the like.

FIG. 3 is a block diagram of a schematic configuration of the above conventional coin processing device 1X. As illustrated in FIG. 3, the coin processing device 1X includes a coin sorting unit 3X that distinguishes whether coins that have been inserted are genuine and also sorts coins each denomination, a coin housing unit 2X that houses, each denomination, the coins that have been sorted by the coin sorting unit 3X and also selects and delivers coins from the coins that have been housed, in response to an amount of change or the like, and a relay harness 4 that electrically couples the coin housing unit 2X and the coin sorting unit 3X. The relay harness 4 is insertable and removable. The reason why the coin processing device 1X includes the above two units is because only the coin sorting unit 3X is made replaceable and also there is a possibility that the coin sorting unit 3X is only used.

A main control device 100 of the vending machine or the like supplies two system voltage power sources including a first high-voltage power source (a high voltage VH1) and a second high-voltage power source (a high voltage VH2), to the coin processing device 1X, and also controls the coin processing device 1X with a control signal S. The high voltage VH2 is lower than the high voltage VH1. The first and second high-voltage power sources are supplied from the coin housing unit 2X to the coin sorting unit 3X through the relay harness 4.

The first high-voltage power source is mainly used for power sources for driving circuits 23 and 37 for a solenoid, a motor, or the like, inside the coin processing device 1X. The second high-voltage power source is converted to a low-voltage power source with a low voltage VL1 lower than the high voltage VH2 inside the coin processing device 1X. A low-voltage power source circuit 32 that generates the low-voltage power source is disposed in the coin sorting unit 3X. The low-voltage power source is used as power sources of a coin sorting circuit 35 and a control circuit 36 in the coin sorting unit 3X. Furthermore, the low-voltage power source is supplied to a control circuit 22 in the coin housing unit 2X through the relay harness 4, and is used as a power source of the control circuit 22.

That is, a flow of power source supply of each of the power sources except the low-voltage power source is as follows:

the main control device 100

↓ the coin housing unit 2X

↓ the coin sorting unit 3X.

In contrast, a flow of power source supply of the low-voltage power source is as follows:

the main control device 100

↓ the coin housing unit 2X

↓↑ the coin sorting unit 3X (the second high-voltage power source generates the low-voltage power source). That is, the low-voltage power source returns from the coin sorting unit 3X to the coin housing unit 2X.

As described above, the reason why the low-voltage power source circuit 32 is not in the coin housing unit 2X but in the coin sorting unit 3X is as follows. That is, in the coin sorting circuit 35 in the coin sorting unit 3X, even when the low voltage VL1 of the low-voltage power source slightly varies due to an individual discrepancy of a power source IC or the like included in the low-voltage power source circuit 32 (typically, a degree of a few percent), an effect occurs in sorting performance for coins. Therefore, upon a factory shipment, adjustments of the sorting performance for coins are performed, including an individual discrepancy of the low-voltage power source circuit 32.

In a case where, for example, the low-voltage power source circuit 32 is disposed in the coin housing unit 2X and then adjustments of coin sorting performance are performed upon a factory shipment, when the coin sorting unit 3X is replaced, the adjustments of coin sorting performance is required to be performed again. Thus, time and labor are required.

A device described in Patent Literature 1 has been known in relation to the coin processing device 1X capable of separating the above coin housing unit 2X and coin sorting unit 3X from each other.

CITATION LIST

Patent Literature

Patent Literature 1: JP 07-114668 A

SUMMARY OF INVENTION

Technical Problem

The relay harness 4 is separated from a connector 31 of the coin sorting unit 3X so that replacement of the coin sorting unit 3X is performed. In order to facilitate replacement work, a structure in which the relay harness 4 and the connector 31 of the coin sorting unit 3X are mutually and easily inserted and removed, is provided. An operator who performs the replacement may perform insertion-and-removal between the relay harness 4 and the connector 31 of the coin sorting unit 3X while power of the main control device 100 has been turned on (live wire insertion-and-removal).

Here, in a moment in which the live wire insertion-and-removal is performed, when a power source line and a signal line are coupled before a ground is coupled, an LSI of the control circuit 22 in the coin housing unit 2X is destroyed. Two breakage modes including breakage through the power source line and breakage through the signal line, will be described below with reference to FIGS. 4 and 5.

1. Breakage Through Power Source Line

In a moment in which connection of the relay harness 4 has been performed while the power has been turned on, when high-voltage power source lines LH1 and LH2 and a low-voltage power source line LL1 are previously coupled in a state where the ground has not been coupled, excess currents instantaneously flow through current channels P1 illustrated by broken lines in FIG. 4. Accordingly, an excess voltage instantaneously occurs in the low-voltage power source line LL1 on the side of the coin housing unit 2X. Then, the LSI (for example, a microcomputer) of the control circuit 22 in the coin housing unit 2X is destroyed.

Specifically, the current channels P1 of the excess currents are as follows:
the high-voltage power source line LH1 or LH2→an aluminum electrolytic capacitor (hereinafter, referred to a capacitor) C1 or C2→a ground of the coin sorting unit 3X (floating)→a capacitor C3 or an internal component of the control circuit 36→the low-voltage power source line LL1.

As described above, the ground of the coin sorting unit 3X has floated. The ground of the coin sorting unit 3X rises to a high voltage. Accordingly, the low-voltage power source line LL1 through the capacitor C3 or the control circuit 36 also rises to the high voltage.

Like a microcomputer, the control circuit 22 that operates with a low-voltage power source, includes components each having low withstand voltage. Therefore, these components are easily destroyed by the excess voltage.

Note that providing the low-voltage power source circuit 32 in each of the coin housing unit 2X and the coin sorting unit 3X and then preventing the low-voltage power source from being supplied to the coin housing unit 2X through the relay harness 4, can prevent the breakage upon the live wire insertion-and-removal. However, two low-voltage power source circuits 32 are required. Thus, cost increases.

When the capacitors C1 to C4 can be eliminated, channels through which excess currents flow are eliminated. Thus, the breakage upon the live wire insertion-and-removal can be prevented. However, the capacitors C1 to C4 are required for stability of power source voltages. Thus, the capacitors C1 to C4 cannot be eliminated.

2. Breakage Through Signal Line

In a moment in which the connection of the relay harness 4 has been performed while the power has been turned on, when the power source lines LH1 and LH2 and signal lines LS1 and LS2 are previously coupled in a state where the ground has not been coupled, excess currents instantaneously flow through current channels P2 illustrated by broken lines in FIG. 5. Accordingly, an excess voltage instantaneously occurs across a signal input terminal and a signal output terminal of the LSI (for example, the microcomputer) in the control circuit 22 on the side of the coin housing unit 2X. Thus, the LSI is destroyed. Alternatively, a large amount of current flows through parasitic diodes of the signal input terminal and the signal output terminal. Then, power of the LSI is turned on. Thus, latch up occurs and the LSI is destroyed.

Specifically, the current channels P2 of the excess currents are as follows:
the high-voltage power source line LH1 or LH2→the capacitor C1 or C2→the ground of the coin sorting unit 3X (floating)→signal terminals of an LSI of the control circuit 36 in the coin sorting unit 3X (through parasitic diodes inside the LSI)→the signal lines LS1 and LS2→the signal terminals of the LSI of the control circuit 22 in the coin housing unit 2X.

As described above, as in the description 1, the ground of the coin sorting unit 3X has floated. Thus, the ground rises to a high voltage. Accordingly, the excess voltage is applied across the signal terminals of the LSI of the control circuit 22 in the coin housing unit 2X through the signal terminals of the LSI of the control circuit 36 in the coin sorting unit 3X.

The present invention has been made in consideration of the above problems. An object to the present invention is to provide a coin processing device capable of preventing breakage of electrical components inside when live wire insertion-and-removal is performed after inhibition of an increase in costs.

Solution to Problem

A coin processing device according to one embodiment of the present invention, includes: a coin sorting unit configured to sort a coin that has been inserted; a coin housing unit configured to house the coin that has been sorted and configured to deliver the coin that has been housed; and a harness configured to electrically couple the coin sorting unit and the coin housing unit. The coin housing unit includes: a first connector including a first terminal coupled to a high-voltage power source, a second terminal to which a low voltage is supplied from the coin sorting unit through the harness, and a first ground terminal grounded; and a control circuit configured to operate with the low voltage supplied to the second terminal, and configured to perform control associated with housing of the coin. The coin sorting unit includes: a second connector including a third terminal coupled to the first connector through the harness, the third terminal to which a high voltage higher than the low voltage is supplied from the high-voltage power source through the first terminal, a fourth terminal configured to supply the low voltage to the second terminal, and a second ground terminal grounded through the first ground terminal; a low-voltage power source circuit including a low-voltage output terminal, configured to generate the low voltage from the high voltage supplied to the third terminal, and configured to output the low voltage from the low-voltage output terminal; and a switch circuit coupled between the low-voltage output terminal and the fourth terminal, in a case where a difference between a voltage at the second ground terminal and a voltage at the low-voltage output terminal has been a predetermined threshold value or more, the switch circuit configured to electrically couple the low-voltage output terminal and the fourth terminal, in a case where the difference between the voltage at the second ground terminal and the voltage at the low-voltage output terminal has been less than the threshold value, the switch circuit configured to disconnect the electrical connection between the low-voltage output terminal and the fourth terminal.

A coin processing device according to another embodiment of the present invention, includes: a coin sorting unit configured to sort a coin that has been inserted; a coin housing unit configured to house the coin that has been sorted and configured to deliver the coin that has been housed; and a harness configured to electrically couple the coin sorting unit and the coin housing unit. The coin housing unit includes: a first connector including a first terminal coupled to a high-voltage power source, a second terminal to which a low voltage is supplied from the coin sorting unit through the harness, and a first ground terminal grounded; and a control circuit configured to operate with the low voltage supplied to the second terminal, and configured to perform control associated with housing of the coin. The coin sorting unit includes: a second connector including a third terminal coupled to the first connector through the harness, the third terminal to which a high voltage higher than the low voltage is supplied from the high-voltage power source through the first terminal, a fourth terminal configured to supply the low voltage to the second terminal, and a second ground terminal grounded through the first ground terminal; a low-voltage power source circuit including a power source terminal, configured to generate the low voltage from a voltage supplied to the power source terminal, and configured to output the low voltage to the fourth terminal; and a switch circuit coupled between the third terminal and the power source terminal, in a case where a difference between a voltage at the second ground terminal and a voltage at the third terminal has been a predetermined threshold value or more, the switch circuit configured to electrically couple the third terminal and the power source terminal, in a case where the difference between the voltage at the second ground terminal and the voltage at the third terminal has been less than the threshold value, the switch circuit configured to disconnect the electrical connection between the third terminal and the power source terminal.

Advantageous Effects of Invention

According to the present invention, breakage of electrical components inside can be prevented when live wire insertion-and-removal is performed after inhibition of an increase in costs.

BRIEF DESCRIPTION OF DRAWINGS

FIG. 1 is a block diagram of a schematic configuration of a coin processing device according to a first embodiment.
FIG. 2 is a block diagram of a schematic configuration of a coin processing device according to a second embodiment.
FIG. 3 is a block diagram of a schematic configuration of a conventional coin processing device.
FIG. 4 is a diagram describing a channel of an excess current through a power source line of the conventional coin processing device.
FIG. 5 is a diagram describing a channel of an excess current through a signal line of the conventional coin processing device.

DESCRIPTION OF EMBODIMENTS

One embodiment of the present invention will be described below with reference to the drawings. The present invention is not limited to the embodiment.

First Embodiment

According to a first embodiment, providing a switch circuit in a low-voltage power source line in a coin sorting unit is one feature.

FIG. 1 is a block diagram of a schematic configuration of a coin processing device 1 according to the first embodiment. As illustrated in FIG. 1, the coin processing device 1 includes a coin housing unit 2, a coin sorting unit 3, and a relay harness (harness) 4. In FIG. 1, constituent units shared with a conventional coin processing device 1X in FIG. 3, are denoted with the same reference signs, and differences will be mainly described below.

The coin sorting unit 3 distinguishes whether coins that have been inserted are genuine, and also sorts coins each denomination. The coin housing unit 2 houses the coins that have been sorted by the coin sorting unit 3, and also selects and delivers coins out of the coins that have been housed, in response to an amount of change or the like.

The coin housing unit 2 includes a first connector 21, a control circuit 22, a driving circuit 23, a Zener diode ZD1, and diodes D3 and D4. These are provided on a relay substrate.

The first connector 21 includes a high-voltage power source terminal TH1, a high-voltage power source terminal (a first terminal) TH2, a low-voltage power source terminal (a second terminal) TL1, a first ground terminal TG1, and signal terminals TS1 and TS2.

The high-voltage power source terminal TH1 is coupled to a first high-voltage power source in a main control device 100. The high-voltage power source terminal TH2 is coupled to a second high-voltage power source in the main control device 100. A low voltage VL1 is supplied from the coin sorting unit 3 to the low-voltage power source terminal TL1 through the relay harness 4.

The first ground terminal TG1 is grounded in the main control device 100. A ground of each unit in the coin housing unit 2 is coupled to the first ground terminal TG1.

The control circuit 22 operates with the low voltage VL1 supplied to the low-voltage power source terminal TL1, receives a control signal S1 from the signal terminal TS1, outputs a control signal S2 to the signal terminal TS2, and performs control associated with housing of coins. For example, the control signal S1 is a signal that indicates delivery of coins. The control signal S2 is a signal that indicates whether a cassette for housing coins has been attached.

The driving circuit 23 operates with the high voltage VH1 (for example, 24V) from the first high-voltage power source, and drives a mechanism (not illustrated) for delivering coins in response to the control of the control circuit 22.

The Zener diode ZD1 includes an anode coupled to the first ground terminal TG1 and a cathode coupled to the low-voltage power source terminal TL1.

The diode D3 includes an anode coupled to the signal terminal TS1 and a cathode coupled to the low-voltage power source terminal TL1.

The diode D4 includes an anode coupled to the signal terminal TS2 and a cathode coupled to the low-voltage power source terminal TL1.

The coin sorting unit 3 includes a second connector 31, low-voltage power source circuits 32 and 33, a switch circuit 34, a coin sorting circuit 35, a control circuit 36, a driving circuit 37, resistors R3 and R4, diodes D1 and D2, and capacitors C1 to C4. These are provided on a main control substrate.

The second connector 31 is coupled to the first connector 21 through the relay harness 4. The second connector 31 includes a high-voltage power source terminal TH3, a high-voltage power source terminal (a third terminal) TH4, a low-voltage power source terminal (a fourth terminal) TL2, a second ground terminal TG2, and signal terminals TS3 and TS4.

The high voltage VH1 is supplied from the first high-voltage power source in the main control device 100 to the high-voltage power source terminal TH3 through the high-voltage power source TH1. The high voltage VH2 (for example, 8V) is supplied from the second high-voltage power source in the main control device 100 to the high-voltage power source terminal TH4 through the high-voltage power source terminal TH2. The low-voltage power source terminal TL2 supplies the low voltage VL1 to the low-voltage power source terminal TL1.

The second ground terminal TG2 is grounded through the first ground terminal TG1. A ground of each unit in the coin sorting unit 3 is coupled to the second ground terminal TG2.

The low-voltage power source circuit 32 includes a low-voltage output terminal 32t, generates the low voltage VL1 (for example, 5V) from the high voltage VH2 supplied to the high-voltage power source terminal TH4, and outputs the low-voltage VL1 from the low-voltage output terminal 32t.

The low-voltage power source circuit 33 generates and outputs a low voltage VL2 (for example, 12V) from the high voltage VH1 supplied to the high-voltage power source terminal TH3. That is, the low-voltage power source circuits 32 and 33 are step-down circuits.

The switch circuit 34 is coupled between the low-voltage output terminal 32t and the low-voltage power source terminal TL2. That is, the switch circuit 34 is provided in a low-voltage power source line LL1.

In a case where a difference between a voltage at the second ground terminal TG2 and a voltage at the low-voltage output terminal 32t has been a predetermined threshold value or more, the switch circuit 34 electrically couples the low-voltage output terminal 32t and the low-voltage power source terminal TL2. In a case where the difference between the voltage at the second ground terminal TG2 and the voltage at the low-voltage output terminal 32t has been less than the threshold value, the switch circuit 34 disconnects the electrical connection between the low-voltage output terminal 32t and the low-voltage power source terminal TL2.

The switch circuit 34 includes a pnp-type bipolar transistor (hereinafter, referred to as a transistor) TR1, a first resistor R1, and a second resistor R2.

The transistor TR1 includes an emitter (one end) coupled to the low-voltage output terminal 32t and a collector (the other end) coupled to the low-voltage power source terminal TL2.

The first resistor R1 is coupled between the emitter of the transistor TR1 and a base (a control terminal) of the transistor TR1.

The second resistor R2 is coupled between the base of the transistor TR1 and the second ground terminal TG2.

The capacitor C1 is coupled between the high-voltage power source terminal TH3 and the second ground terminal TG2.

The capacitor C2 is coupled between the high-voltage power source terminal TH4 and the second ground terminal TG2. The capacitor C3 is coupled between the low-voltage output terminal 32t and the second ground terminal TG2. The capacitor C4 includes one end to which the low voltage VL2 is supplied, and the other end coupled to the second ground terminal TG2.

The coin sorting circuit 35 operates with the low voltages VL1 and VL2, and then sorts coins. Sorting performance of coins depends on magnitude of each of the low voltages VL1 and VL2.

The control circuit 36 operates with the low voltage VL1, outputs the control signal S1, receives the control signal S2, and controls the driving circuit 37 in response to a sorting result of the coin sorting circuit 35.

The driving circuit 37 operates with the high-voltage VH1, and drives a mechanism (not illustrated) for sorting (distributing) the coins each denomination in response to the control of the second control circuit 36.

The resistor R3 includes one end to which the control signal S1 is supplied, and the other coupled to the signal terminal TS3. The resistor R4 outputs the control signal S2 from one end, and includes the other coupled to the signal terminal TS4.

The diode D1 includes an anode coupled to the second ground terminal TG2 and a cathode coupled to the one end of the resistor R3. The diode D2 includes an anode coupled to the second ground terminal TG2 and a cathode coupled to the one end of the resistor R4.

Next, power source supplying operation of the coin processing device 1 will be described.

In normal operation in which all of the terminals of the first connector 21 and the second connector 31 have been correctly coupled through the relay harness 4, the second ground terminal TG2 is grounded through the first ground terminal TG1. In this case, the difference between the voltage at the second ground terminal TG2 and the low voltage VL1 at the low-voltage output terminal 32t becomes the threshold value or more. Thus, the transistor TR1 has been continuously turned on. Accordingly, the low voltage VL1 is correctly supplied from the coin sorting unit 3 to the coin housing unit 2 through the transistor TR1 that has been turned on.

Meanwhile, in a case where live wire insertion-and-removal has been performed and only the second ground terminal TG2 in the coin sorting unit 3 has not been coupled, the voltage at the second ground terminal TG2 in a floating state instantaneously increases to the high voltage VH1 through the capacitors C1 and C2. The voltage at the voltage output terminal 32t becomes equal to the voltage at the second ground terminal TG2 through the capacitor C3. Thus, the transistor TR1 is turned off, and the electrical connection between the voltage output terminal 32t and the low-voltage power source terminal TL2 is disconnected. Accordingly, an excess current and an excess voltage to the low-voltage power source terminal TL2 are disconnected. Thus, the excess voltage is prevented from being applied to the control circuit 22 in the coin housing unit 2, the control circuit being coupled to the low-voltage power source terminal TL2 through the low-voltage power source terminal TL1.

Regarding breakage through a signal line, the diodes D1 and D2 bypass excess currents flowing through parasitic diodes of an LSI inside the control circuit 36 or the like. The diodes D3 and D4 bypass excess currents flowing through parasitic diodes of an LSI inside the control circuit 22. Therefore, breakage or damage of these LSIs can be prevented. The resistors R3 and R4 can limit the excess currents flowing through the diodes D1 to D4 or the like. Furthermore, the Zener diode ZD1 can inhibit an increase of the low voltage VL1 due to the excess currents that have been bypassed.

Currents flowing through the Zener diode ZD1 have been limited by the resistors R3 and R4 and have become sufficiently small values. Thus, current capacity of the Zener diode ZD1 may be small for use. Therefore, a Zener diode similar to that in the related art in FIG. 3 can be used for the Zener diode ZD1.

In a case where the currents have been sufficiently limited by the resistors R3 and R4, the diodes D1 to D4 and the Zener diode ZD1 need not be provided.

As described above, according to the present embodiment, in a case where the difference between the voltage at the second ground terminal TG2 and the voltage at the voltage output terminal 32t, has been less than the threshold value, the switch circuit 34 that disconnects the electrical connection between the voltage output terminal 32t and the low-voltage power source terminal TL2, is provided in the coin sorting unit 3. Accordingly, in a case where the live wire insertion-and-removal has been performed and only the second ground terminal TG2 in the coin sorting unit 3 has not been coupled, the excess voltage can be prevented from being applied to the control circuit 22 in the coin housing unit 2.

The switch circuit 34 can be constituted of the transistor TR1, the first resistor R1, and the second resistor R2, and is inexpensive.

Accordingly, the breakage of electrical elements inside can be prevented when the live wire insertion-and-removal is performed after inhibition of an increase in costs.

Second Embodiment

A second embodiment is different from the first embodiment in that operation is performed with one system power source including a high-voltage power source and two system power sources including two low-voltage power sources, and a switch circuit is provided in a high-voltage power source line.

FIG. 2 is a block diagram of a schematic configuration of a coin processing device 1a according to a second embodiment. In FIG. 2, constituent units shared in FIG. 1 are denoted with the same reference signs, and differences will be mainly described below.

A first connector 21a in a coin housing unit 2a includes a high-voltage power source terminal (a first terminal) TH1a, a low-voltage power source terminal TL1a, a low-voltage power source terminal (a second terminal) TL2a, a first ground terminal TG1, and signal terminals TS1 and TS2.

The high-voltage power source terminal TH1a is coupled to a high-voltage power source in a main control device 100a. A low voltage VL1 is supplied from a coin sorting unit 3a to the low-voltage power source terminal TL1a through a relay harness 4. A low voltage VL2 is supplied from the coin sorting unit 3a to the low-voltage power source terminal TL2a through the relay harness 4.

A control circuit 22 in the coin housing unit 2a operates with the low voltage VL1 supplied to the low-voltage power source terminal TL1a and the low voltage VL2 supplied to the low-voltage power source terminal TL2a.

The coin sorting unit 3a includes a second connector 31a, low-voltage power source circuits 32 and 33, the switch circuit 34a, a coin sorting circuit 35, a control circuit 36, a driving circuit 37, resistors R3 and R4, diodes D1 and D2, and capacitors C1, C3, and C4.

The second connector 31a includes a high-voltage power source terminal (a third terminal) TH2a, a low-voltage power source terminal TL3a, a low-voltage power source terminal (a fourth terminal) TL4a, a second ground terminal TG2, and signal terminals TS3 and TS4.

A high voltage VH1 is supplied from the high-voltage power source in the main control device 100a to the high-voltage power source terminal TH2a through the high-voltage power source terminal TH1a. The low-voltage power source terminal TL3a supplies the low voltage VL1 to the low-voltage power source terminal TL1a. The low-voltage power source terminal TL4a supplies the low voltage VL2 to the low-voltage power source terminal TL2a.

The low-voltage power source circuit 33 includes a power source terminal 33t, generates the low voltage VL2 from the high voltage VH1 supplied to the power source terminal 33t, and outputs the low voltage VL2 to the low-voltage power source terminal TL4a.

The low-voltage power source circuit 32 generates the low voltage VL1 from the low voltage VL2 and outputs the low voltage VL1 to the low-voltage power source terminal TL3a.

The switch circuit 34a is coupled between the high-voltage power source terminal TH2a and the power source terminal 33t. That is the switch circuit 34a is provided in a high-voltage power source line LH1.

In a case where a difference between a voltage at the second ground terminal TG2 and a voltage at the high-voltage power source terminal TH2a has been a predetermined threshold value or more, the switch circuit 34a electrically couples the high-voltage power source terminal TH2a and the power source terminal 33t. In a case where the difference between the voltage at the second ground terminal TG2 and the voltage at the high-voltage power source terminal TH2a has been less than the threshold value, the switch circuit 34a disconnects the electrical connection between the high-voltage power source terminal TH2a and the power source terminal 33t.

The switch circuit 34a includes a transistor TR1, a first resistor R1, a second resistor R2, and a Zener diode ZD2.

The transistor TR1 includes an emitter coupled to the high-voltage power source terminal TH2a and a collector coupled to the power source terminal 33t.

The first resistor R1 is coupled between the emitter of the transistor TR1 and a base of the transistor TR1. The second resistor R2 includes one end coupled to the base of the transistor TR1.

The Zener diode ZD2 is coupled between the other end of the second resistor R2 and the second ground terminal TG2 Specifically, the Zener diode ZD2 includes an anode coupled to the second ground terminal TG2 and a cathode coupled to the second resistor R2.

A Zener voltage of the Zener diode ZD2 is higher than a value acquired by subtracting the lower value of a maximum value of the low voltage VL1 allowable by the control circuit 22 in the coin housing unit 2a or a maximum value of the low voltage VL2 allowable by the control circuit 22, from the high voltage VH1. The maximum values of the low voltages VL1 and VL2 allowable by the control circuit 22 mean maximum values with which breakage or damage of the control circuit 22 can be prevented.

The threshold value of the switch circuit 34a is substantially equivalent to the Zener voltage of the Zener diode ZD2.

The capacitor C1 is coupled between the power source terminal 33t and the second ground terminal TG2. The capacitor C3 includes one end to which the low voltage VL1 is supplied, and the other coupled to the second ground terminal TG2. The capacitor C4 includes one end to which the low voltage VL2 is supplied, and the other end coupled to the second ground terminal TG2.

Next, power source supplying operation of the coin processing device 1a will be described.

In normal operation, the second ground terminal TG2 is grounded through the first ground terminal TG1. In this case, the difference between the voltage at the second ground terminal TG2 and the high voltage VH1 at the high-voltage power source terminal TH2a becomes the threshold value or more. Thus, the Zener diode ZD2 and the transistor TR1 have been continuously turned on. Accordingly, the high voltage VH1 is correctly supplied to the power source terminal 33t of the low-voltage power source circuit 33 through the transistor TR1 that has been turned on.

Meanwhile, in a case where live wire insertion-and-removal has been performed and only the second ground terminal TG2 in the coin sorting unit 3a has not been coupled, a current flows from the high-voltage power source terminal TH2a through the first resistor R1, the second resistor R2, the Zener diode ZD2, the ground in the coin sorting unit 3a (the second ground terminal TG2), the diode D1 (or D2), the resistor R3 (or R4), the diode D3 (or D4), a Zener diode ZD1, and the ground in the coin housing unit 2a in this order. Accordingly, the transistor TR1 becomes turned on.

When the transistor TR1 is turned on, the current flows to the ground in the coin sorting unit 3a through the transistor TR1 and the capacitor C1. Then, the voltage of the ground increases. The voltage of the ground in the coin sorting unit 3a is substantially equivalent to the low voltages VL1 and VL2.

In a moment in which the voltage of the ground in the coin sorting unit 3a has increased to a certain voltage, the voltage across both ends of the Zener diode ZD2 becomes less than the Zener voltage. Then, the Zener diode ZD2 is turned off. Accordingly, the transistor TR1 is turned off.

Here, the Zener voltage of the Zener diode ZD2 has been set as described above. Thus, the Zener diode ZD2 is turned off before the low voltages VL1 and VL2 exceed the maximum values allowable.

Accordingly, an excess voltage exceeding a maximum value allowable can be prevented from being applied to the control circuit 22 in the coin housing unit 2a.

Regarding breakage through a signal line, prevention can be performed as in first embodiment.

In contrast, in a case where the switch circuit 34a has not been provided, and in a case where live wire insertion-and-removal has been performed and only the second ground terminal TG2 in the coin sorting unit 3a has not been coupled, as in the related art, for example, excess currents flow through the following channels:
the high-voltage power source line LH1→the capacitor C1→the ground in the coin sorting unit 3a (floating)→the capacitors C3 and C4 or internal components in the control circuit 36→low-voltage power source lines LL1 and LL2.

Accordingly, in a case where the switch circuit 34a has not been provided, an excess voltage is applied so that an LSI of the control circuit 22 in the coin housing unit 2a is destroyed. However, according to the present embodiment, the breakage can be prevented.

As described above, according to the present embodiment, the switch circuit 34a that disconnects the electrical connection between the high-voltage power source terminal TH2a and the power source terminal 33t in a case where the difference between the voltage at the second ground terminal TG2 and the voltage at the high-voltage power source terminal TH2a, has been less than the threshold value, is provided in the coin sorting unit 3a. Accordingly, in a case where live wire insertion-and-removal has been performed and only the second ground terminal TG2 in the coin sorting unit 3a has not been coupled, an excess voltage can be prevented from being applied to the control circuit 22 in the coin housing unit 2a.

The switch circuit 34a can be constituted of the transistor TR1, the first resistor R1, the second resistor R2, and the Zener diode ZD2, and is inexpensive. Accordingly, an effect similar to that according to the first embodiment is acquired.

Note that, as the transistor TR1, a P-type field effect transistor may be used in the first and second embodiments.

Some embodiments of the present invention have been described above. These embodiments have been presented as examples. The scope of the invention is not limited to the embodiments. These embodiments may be performed by various other embodiments. Various omissions, replacements, and alterations may be made without departing from the spirit of the invention. These embodiments and modifications are included in the scope and the spirit of the invention. In addition, these embodiments and modifications are included in the scope of the invention described in the claims and equivalents thereof.

REFERENCE SIGNS LIST 1, 1a coin processing device
2, 2a coin housing unit
3, 3a coin sorting unit
4, 4a relay harness
21, 21a first connector
22 control circuit
23 driving circuit
31, 31a second connector
32,33 low-voltage power source circuit
34, 34a switch circuit
35 coin sorting circuit
36 control circuit
37 driving circuit
TR1 transistor
R1 first resistor
R2 second resistor
R3, R4 resistors
D1 to D4 diodes
C1 to C4 capacitors
ZD1, ZD2 Zener diodes

The invention claimed is:

1. A coin processing device comprising:
a coin sorting unit configured to sort a coin that has been inserted;
a coin housing unit configured to house the coin that has been sorted and configured to deliver the coin that has been housed; and
a harness configured to electrically couple the coin sorting unit and the coin housing unit,
wherein the coin housing unit includes:
a first connector including a first terminal coupled to a high-voltage power source, a second terminal to which a low voltage is supplied from the coin sorting unit through the harness, and a first ground terminal grounded; and
a control circuit configured to operate with the low voltage supplied to the second terminal, and configured to perform control associated with housing of the coin, and
the coin sorting unit includes:
a second connector including a third terminal coupled to the first connector through the harness, the third terminal to which a high voltage higher than the low voltage is supplied from the high-voltage power source through the first terminal, a fourth terminal configured to supply the low voltage to the second terminal, and a second ground terminal grounded through the first ground terminal;

a low-voltage power source circuit including a low-voltage output terminal, configured to generate the low voltage from the high voltage supplied to the third terminal, and configured to output the low voltage from the low-voltage output terminal; and a switch circuit coupled between the low-voltage output terminal and the fourth terminal, in a case where a difference between a voltage at the second ground terminal and a voltage at the low-voltage output terminal has been a predetermined threshold value or more, the switch circuit configured to electrically couple the low-voltage output terminal and the fourth terminal, in a case where the difference between the voltage at the second ground terminal and the voltage at the low-voltage output terminal has been less than the threshold value, the switch circuit configured to disconnect the electrical connection between the low-voltage output terminal and the fourth terminal.

2. The coin processing device according to claim 1, wherein the switch circuit includes:

a transistor including one end coupled to the low-voltage output terminal and another end coupled to the fourth terminal;

a first resistor coupled between the one end of the transistor and a control terminal of the transistor; and a second resistor coupled between the control terminal of the transistor and the second ground terminal.

3. A coin processing device comprising:

a coin sorting unit configured to sort a coin that has been inserted;

a coin housing unit configured to house the coin that has been sorted and configured to deliver the coin that has been housed; and a harness configured to electrically couple the coin sorting unit and the coin housing unit, wherein the coin housing unit includes:

a first connector including a first terminal coupled to a high-voltage power source, a second terminal to which a low voltage is supplied from the coin sorting unit through the harness, and a first ground terminal grounded; and a control circuit configured to operate with the low voltage supplied to the second terminal, and configured to perform control associated with housing of the coin, and the coin sorting unit includes:

a second connector including a third terminal coupled to the first connector through the harness, the third terminal to which a high voltage higher than the low voltage is supplied from the high-voltage power source through the first terminal, a fourth terminal configured to supply the low voltage to the second terminal, and a second ground terminal grounded through the first ground terminal;

a low-voltage power source circuit including a power source terminal, configured to generate the low voltage from a voltage supplied to the power source terminal, and configured to output the low voltage to the fourth terminal; and a switch circuit coupled between the third terminal and the power source terminal, in a case where a difference between a voltage at the second ground terminal and a voltage at the third terminal has been a predetermined threshold value or more, the switch circuit configured to electrically couple the third terminal and the power source terminal, in a case where the difference between the voltage at the second ground terminal and the voltage at the third terminal has been less than the threshold value, the switch circuit configured to disconnect the electrical connection between the third terminal and the power source terminal.

4. The coin processing device according to claim 3, wherein the switch circuit includes:

a transistor including one end coupled to the third terminal and another end coupled to the power source terminal;

a first resistor coupled between the one end of the transistor and a control terminal of the transistor;

a second resistor including one end coupled to the control terminal of the transistor; and a Zener diode coupled between another end of the second resistor and the second ground terminal.

5. The coin processing device according to claim 4, wherein a Zener voltage of the Zener diode is larger than a value acquired by subtracting a maximum value of the low voltage allowable by the control circuit from the high voltage.

* * * * *